United States Patent [19]

Ghani et al.

[11] Patent Number: 6,160,793
[45] Date of Patent: Dec. 12, 2000

[54] ECN-BASED APPROACH FOR CONGESTION MANAGEMENT IN HYBRID IP-ATM NETWORKS

[75] Inventors: Nasir Ghani, Woburn; Sudhir Dixit, Weston, both of Mass.

[73] Assignee: Nokia Telecommunications, Oy, Espoo, Finland

[21] Appl. No.: 09/170,276

[22] Filed: Oct. 13, 1998

[51] Int. Cl.[7] .............................. H04J 3/14; H04L 12/56
[52] U.S. Cl. ............................................ 370/236; 709/235
[58] Field of Search .................................... 370/230, 231, 370/232, 235, 236, 395, 465, 466, 469, 474, 355, 400, 401, 410; 709/232, 234, 235

[56] References Cited

U.S. PATENT DOCUMENTS

| | | | |
|---|---|---|---|
| 5,313,454 | 5/1994 | Bustini et al. ............................ | 370/231 |
| 5,457,687 | 10/1995 | Newman ................................... | 370/232 |
| 5,600,798 | 2/1997 | Cherukuri et al. ....................... | 709/232 |
| 5,638,371 | 6/1997 | Raychaudhuri et al. ................ | 370/347 |
| 5,835,484 | 11/1998 | Yamato et al. ........................... | 370/230 |
| 5,898,669 | 4/1999 | Shimony et al. ......................... | 370/232 |
| 5,987,430 | 11/1999 | Van Horne et al. ....................... | 705/34 |

OTHER PUBLICATIONS

"Internet Article", Integrated Services in the Internet Architecture: and Overview, http://www.ietf.org/rfc/rfc1633.txt, last updated Jun. 1994, pp. 1–29.

"Internet Article", Internet Protocol, Version 6 (IPv6) Specification, http://afs.wu–wien.ac.at/manuals/rfc/rfc1883.txt, last updated Dec. 1995, pp. 1–33.

*Primary Examiner*—Min Jung
*Attorney, Agent, or Firm*—Altera Law Group LLC

[57] ABSTRACT

A method and apparatus for coupling IP ECN with ATM congestion control is disclosed. The invention extends IP-ECN to ATM devices with minimal implementation complexity. Thus, the performance of IP data traffic over ATM is enhanced without requiring packet-reconstruction at the ATM layer. The method includes using AAL5 packet trailers in ATM cells to detect packet boundaries for identifying a first cell in an IP packet, determining whether an ATM cell capable of using explicit congestion notification to indicate congestion and setting a explicit congestion notification indicator in a capable ATM cell to indicated congestion to a source node. The use of the packet trailers further comprises monitoring a flag for indicating whether an ATM cell is an end of packet. The method further includes resetting the end of packet flag to an off state to so the next cell is recognized a first cell of a packet and transmitting the ATM cell. A determination is made as to whether a next ATM cell is a first ATM cell for a packet. The next ATM cell is transmitted when the ATM cell is not a first ATM cell for a packet. A determination is then made as to whether ATM congestion is associated with the next ATM cell. The next ATM cell is then transmitted when congestion is not associated with the next ATM cell.

21 Claims, 7 Drawing Sheets

ECN-BASED APPROACH FOR CONGESTION MANAGEMENT IN HYBRID IP-ATM NETWORKS

BACKGROUND OF THE INVENTION

1. Field of the Invention

This invention relates in general to a hybrid Internet Protocol-Asynchronous Transfer Mode (IP-ATM) networks, and more particularly to a method and apparatus for coupling IP explicit congestion notification (ECN) with ATM congestion control.

2. Description of Related Art

Today, an organization's computer network has become its circulatory system. Organizations have combined desktop work stations, servers, and hosts into Local Area Network (LAN) communities. These Local Area Networks have been connected to other Local Area Networks and to Wide Area Networks (WANs). It has become a necessity of day-to-day operation that pairs of systems must be able to communicate when they need to, without regard to where they may be located in the network.

During the early years of network computing, proprietary networking protocols were the standard. However, the development of the Open Systems Interconnection Reference Model introduced by the International Organization for Standardization (ISO) has led to an impressive degree of interworking, which generally allows end-user applications to work very well between systems in a network. Implementations are based on written standards that have been made available by volunteers from dozens of computer vendors, hardware component vendors and independent software companies.

During the last decade, LANs have been proliferating. This has created a recurring problem of how to minimize congestion and optimize throughput that must be solved by network managers. An early solution was to simply divide Local Area Networks into multiple smaller networks serving smaller populations. These segments were connected by bridges to form a single Local Area Network with traffic being segregated locally to each segment.

The evolution of new network types and Wide Area Networks created a need for routers. For example, the Internet is a set of networks connected by gateways, which are sometimes referred to as routers. Routers added filtering and firewalling capability to provide more control over broadcast domains, limit broadcast traffic and enhance security. A router is able to chose the best path through the network due to embedded intelligence. This added intelligence also allowed routers to build redundant paths to destinations when possible. Nevertheless, the added complexity of best path selection capability accorded by the embedded intelligence increased the port cost of routers and caused substantial latency overhead. Shared-media networks comprising distributed client/server data traffic, expanded user populations and more complex applications gave birth to new bandwidth bottlenecks. Such congestion produced unpredictable network response times, the inability to support the delay-sensitive applications and higher network failure rates.

The Internet Protocol (IP) is a network layer protocol that routes data across an Internet. The Internet Protocol was designed to accommodate the use of host and routers built by different vendors, encompass a growing variety of growing network types, enable the network to grow without interrupting servers, and support higher-layer of session and message-oriented services. The IP network layer allows integration of Local Area Network "islands".

Transmission Control Protocol (TCP) is a part of the TCP/IP protocol family that has gained the position as one of the world's most important data communication protocols with the success of the Internet. TCP provides a reliable data connection between devices using TCP/IP protocols. TCP operates on top of IP that is used for packing the data to data packets, called datagrams, and for transmitting across the network.

However, IP doesn't contain any flow control or retransmission mechanisms. That is why TCP is typically used on top of it. Especially, TCP uses acknowledgments for detecting lost data packets. TCP/IP networks are nowadays probably the most important of all networks, and operate on top of several (physical) networks. These underlying networks may offer some information about the condition of network and traffic, which may be used to provide feedback regarding congestion.

Asynchronous Transfer Mode (ATM) has become a successful and popular network technology because of its ability to transport legacy data traffic, mostly IP, over its network infrastructure. ATM is connection-oriented, that is, a connection need to established between two parties before they can send data to each other. Once the connection is set up, all data between them is sent along the connection path. On the contrary, IP is connectionless so that no connection is needed and each IP packet is forwarded by routers independently on a hop-by-hop basis. When we need to transport IP traffic over an ATM network, we have two options. Either a new connection is established on demand between two parties or the data is forwarded through preconfigured connection or connections. With the first approach, when the amount of data to be transferred is small, the expensive cost of setting up and tearing down a connection is not justified. On the other hand, with the second approach the preconfigured path(s) may not be an optimal path and may become overwhelmed by the amount of data being transferred.

Further, Quality of Service (QoS) is an important concept in ATM networks. QoS includes parameters such as bandwidth and delay requirements of a connection. Such requirements are included in the signaling messages used to establish a connection. However, Current IP (IPv4) has no such concepts and each packet is forwarded on a best effort basis by the routers. To take advantage of the QoS guarantees of the ATM networks, the IP protocol need to be modified to include that information.

Congestion control in today's Internet is increasingly becoming an important issue. The explosive growth of applications such as the World Wide Web (WWW) has pushed current technology to its limit, and it is clear that faster transport and improved congestion control mechanisms are required. As a result, many equipment vendors and service providers are turning to ATM technology to provide adequate solutions to the complex resource management issues involved. At the same time, there is a very large, concerted effort to improve the service offerings within IP networks themselves. This is clearly evidenced by the emergence of the IPv6 protocol specification, i.e., IP Next Generation, and the integrated and differentiated services models in the Internet Engineering Task Force (IETF). As a result, it is advantageous to design inter-working schemes which will be able to best leverage the advanced features of ATM technology to enhance the operation of the emerging next generation IP services over ATM networks.

Current IP networks cannot explicitly slow down, or even indicate congestion to, overloading data sources. For example, the ubiquitous TCP protocol relies on implicit congestion notification in the form of packet drops to detect network congestion, i.e., either via timeouts or duplicate acknowledgment packet (ACK) reception. Meanwhile, the UDP protocol even lacks such coarse indication methods. Recently, though, the Internet community is proposing the use of more advanced, faster congestion control mechanisms for the next generation of Internet services. A key such proposal emerging from the IETF is the differentiated services, i.e., DiffServ paradigm. On a very high level, this approach relies on packet classification (at the ingress) to label packets as belonging to one of several drop priorities. Network routers then rely on these labels to selectively process, i.e., buffer, drop, etc., packets during overload periods. The labels are identified via an 5-bit field in the Type of Service (TOS) byte specified in the IPv6 header, called the DS byte. In addition, two bits of this byte, the CU (currently unused) bits, have been reserved for future assignment. More specifically, these are for experimentation with explicit congestion notification (ECN) schemes. ECN is an attempt to directly incorporate network-bawd feedback into the IPv6 protocol. Similar strategies arc already available in the ATM and frame relay specifications.

For example, Sally Floyd and K. K. Ramakrishnan have submitted an Internet draft entitled "A Proposal To Add Explicit Congestion Notification (ECN) to IPv6 and to TCP" that proposes to use two CU bits to provide an indication of congestion: one bit is used to identify ECN-capable equipment and bit is used to actually indicate congestion. Overall, the results with ECN-TCP have shown improved performance over conventional implementations, especially with regards to end-to-end packet delays. By more effectively indicating congestion, queue levels can be maintained about reasonable operating levels thereby reducing buffering delays.

Although the above described proposals were directed towards TCP, more generic applications for future protocols are needed. For example, a similar one-bit IP ECN approach with additional Internet Control Message Protocol (ICMP) based extensions has also been proposed. As of yet, however, no bits have been formally reserved in the IPv6 header for ECN purposes.

It can be seen then that there is a need for a method and apparatus for coupling IP ECN with ATM congestion control.

It can also be seen that there is a need for a method and apparatus for extending IP ECN to ATM devices with minimal implementation complexity.

It can also be seen that there is a need for a method and apparatus for enhancing the performance of IP data traffic over ATM without requiring packet-reconstruction at the ATM layer.

SUMMARY OF THE INVENTION

To overcome the limitations in the prior art described above, and to overcome other limitations that will become apparent upon reading and understanding the present specification, the present invention discloses a method and apparatus for coupling IP ECN with ATM congestion control.

The present invention solves the above-described problems by extending IP-ECN to ATM devices with minimal implementation complexity. Thus, the performance of IP data traffic over ATM is enhanced without requiring packet-reconstruction at the ATM layer.

A method in accordance with the principles of the present invention includes using AAL5 packet trailers in ATM cells to detect packet boundaries for identifying a first cell in an IP packet, determining whether an ATM cell is capable of using explicit congestion notification to indicate congestion, and setting a explicit congestion notification indicator in a capable ATM cell to indicated congestion to a source node.

Other embodiments of a system in accordance with the principles of the invention may include alternative or optional additional aspects. One such aspect of the present invention is that the use of the packet trailers further comprises monitoring a flag for indicating whether an ATM cell is an end of packet.

Another aspect of the present invention is that the method further includes resetting the end of packet flag to an off state so that the next cell is recognized as a first cell of a packet and transmitting the ATM cell.

Another aspect of the present invention is that the method further includes determining whether a next ATM cell is a first ATM cell for a packet.

Another aspect of the present invention is that the method further includes transmitting the next ATM cell when the ATM cell is not a first ATM cell for a packet.

Another aspect of the present invention is that the method further includes determining whether ATM congestion is associated with the next ATM cell.

Another aspect of the present invention is that the method further includes transmitting the next ATM cell when congestion is not associated with the next ATM cell.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus for coupling IP ECN with ATM congestion control. IP-ECN is thus extended to ATM devices with minimal implementation complexity without requiring packet-reconstruction at the ATM layer.

Figure 1:
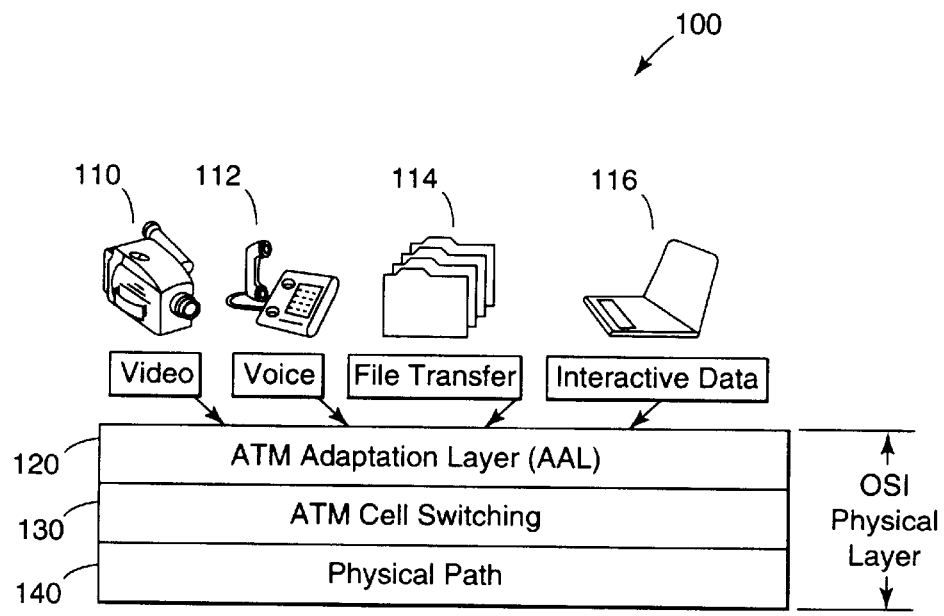
FIG. 1 illustrates the Open Systems Interconnection (OSI) physical layer of an ATM network.

FIG. 1 illustrates the Open Systems Interconnection (OSI) physical layer of an ATM network 100. Modern networks must handle multiple types of traffic such as video 110, voice 112, data files 114, and interactive data 116. The ATM Adaptation Layer (AAL) 120 is a collection of standardized protocols that provide services to higher layers by adapting user traffic to a cell format. The AAL 120 is divided into the Convergence Sublayer (CS) and the Segmentation and Reassembly (SAR) sublayer (not shown). The ATM Layer 130 is the second layer of the ATM protocol stack model 100 that constructs and processes the ATM cells. The functions of the ATM layer 130 also include Usage Parameter Control (UPC) and support of Quality of Service (QoS) classes. Finally, the physical layer 140 is the bottom layer of the ATM protocol reference model 100. The physical layer 140 is subdivided into two sublayers, the Transmission Convergence (TC) and the Physical Medium (PM) (also not shown). The physical layer 140 provides the ATM cells transmitted over the physical interfaces that interconnect ATM devices.

Figure 2:
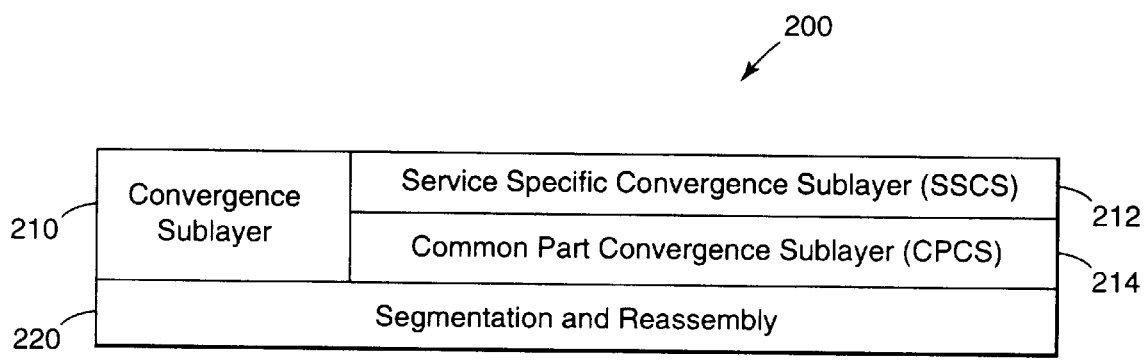
FIG. 2 illustrates the format of the AAL.

FIG. 2 illustrates the format of the AAL 200. The AAL 200 is the service-dependent sublayers of the data link layer. In order for ATM to support many kinds of services with different traffic characteristics and system requirements, it is necessary to adapt the different classes of applications to the ATM layer. The AAL 200 accepts data from different applications and presents it to the ATM layer in the form of 48-byte ATM payload segments.

As shown in FIG. 2, AALs are composed of a convergence sublayer (CS) 210 and a segmentation and reassembly (SAR) sublayer 220. The CS is further composed of a service specific convergence sublayer (SSCS) 212 and a common part convergence sublayer (CPCS) 214. SAR 220 segments higher layer PDUs into 48 byte chunks that are fed into the ATM layer to generate 53 byte cells. CPCS 214 provides services such as padding and CRC checking. The CPCS 214 takes a PDU from the SSCS 212, adds padding if needed, and then adds an 8-byte trailer such that the total length of the resultant PDU is a multiple of 48. The trailer consist of a 2 bytes reserved, 2 bytes of packet length, and 4 bytes of CRC. SSCS 212 is service dependent and may provide services such as assured data transmission based on retransmissions.

Four types of AAL were originally recommended by CCITT (now ITU-T). Two of these (3 and 4) have now been merged into one, AAL 3/4. Briefly the four AALs are: AAL1, AAL2, AAL3/4 and AAL5. AAL1 supports connection-oriented services that require constant bit rates and have specific timing and delay requirements. Example are constant bit rate services like DS1 or DS3 transport. AAL2 supports connection-oriented services that do not require constant bit rates. In other words, variable bit rate applications like some video schemes. AAL3/4 is intended for both connectionless and connection oriented variable bit rate services. Originally two distinct adaptation layers AAL3 and 4, they have been merged into a single AAL which name is AAL3/4 for historical reasons.

Figure 3:
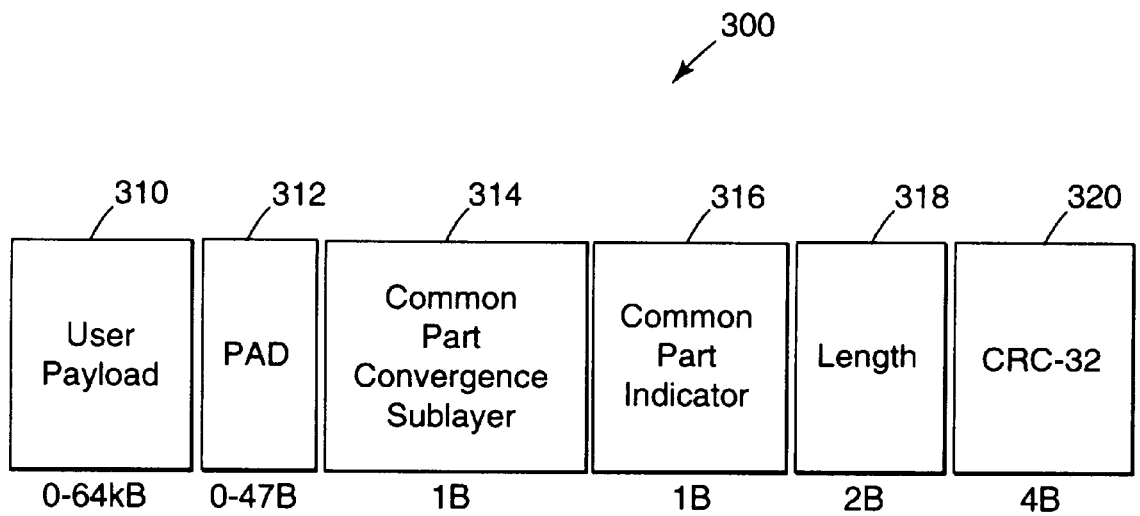
FIG. 3 illustrates the AAL5 CPCS-PDU.

Finally, AAL5 supports connection-oriented variable bit rate data services. FIG. 3 illustrates the AAL5 CPCS-PDU 300. AAL5 300 is a substantially lean AAL compared with AAL3/4 at the expense of error recovery and built in retransmission. This tradeoff provides a smaller bandwidth overhead, simpler processing requirements, and reduced implementation complexity. Some organizations have proposed AAL5 for use with both connection-oriented and connectionless services.

As shown in FIG. 3, the Payload field 310 contains user information up to $2^{16}-1$ octets (65535 bytes). The PAD field 312 pads the CPCS-PDU to fit exactly into the ATM cells such that the last 48 octet cell payload created by the SAR sublayer will have the CPCS-PDU Trailer right justified in the cell. The CPCS-UU (User-to-User indication) field 314 is used to transparently transfer CPCS user to user information. The CPCS-UU field 314 has no function under the multiprotocol ATM encapsulation and can be set to any value. The CPI (Common Part Indicator) field 316 aligns the CPCS-PDU trailer to 64 bits. The Length field 318 indicates the length, in octets, of the Payload field. The maximum value for the Length field is 65535 octets. A Length field coded as 0×00 is used for the abort function. The CRC field 320 protects the entire CPCS-PDU except the CRC field itself.

To indicate congestion, explicit congestion notification (ECN) is used, wherein network nodes set a bit in the IP packet header. In the past, ECN has been used for both packet based and ATM cell based networks. This is usually done by more advanced routers which are capable of reliably detecting congestion. For example, such congestion detection functionality is already beginning to emerge in product lines, i.e., random early detection (RED) routers.

Figure 4:
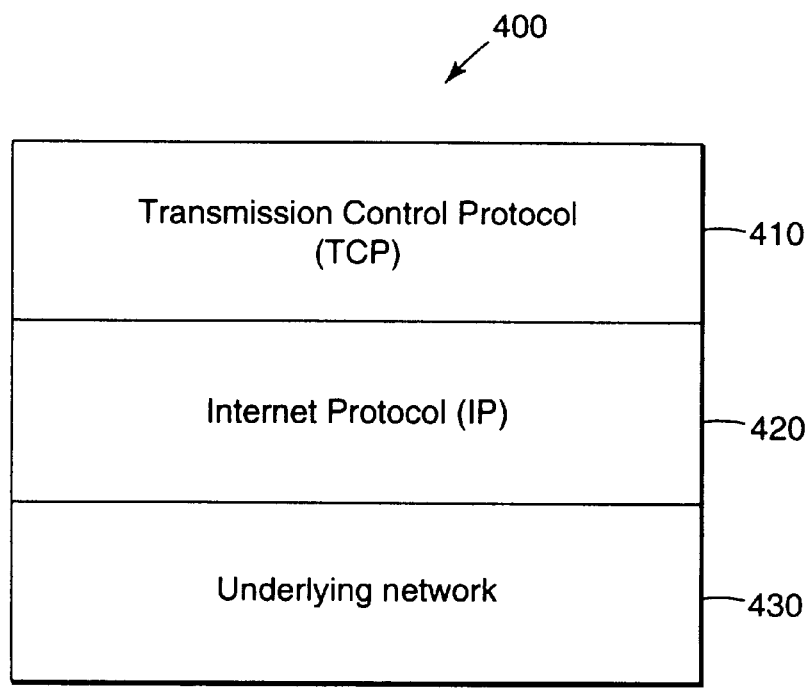
FIG. 4 illustrates a TCP/IP protocol stack.

One of the first ECN proposals was directed to improving the performance of the TCP protocol. FIG. 4 illustrates a TCP/IP protocol stack 400. As mentioned above, the TCP layer 410 is a part of the TCP/IP protocol family that has gained the position as one of the world's most important data communication protocols with the success of Internet. The TCP layer 410 provides a reliable data connection between devices using TCP/IP protocols. The TCP layer 410 operates on top of the IP layer 420 that is used for packing the data to data packets, called datagrams, and for transmitting the across the underlying network 430.

However, the IP protocol doesn't contain any flow control or retransmission mechanisms. That is why the TCP layer 410 is typically used on top of the IP layer 420. In contrast, TCP protocols provide acknowledgments for detecting lost data packets. According to the IP protocol, congested network routers set the ECN bits in the headers of passing IP packets. These bit settings are subsequently echoed back towards the source by modified ECN-TCP clients, i.e., in returning ACK packets. Upon receiving TCP ACK packets, i.e., IP, with the ECN bit set, a TCP source reduces its window size appropriately to set the transmission rate.

Figure 5:
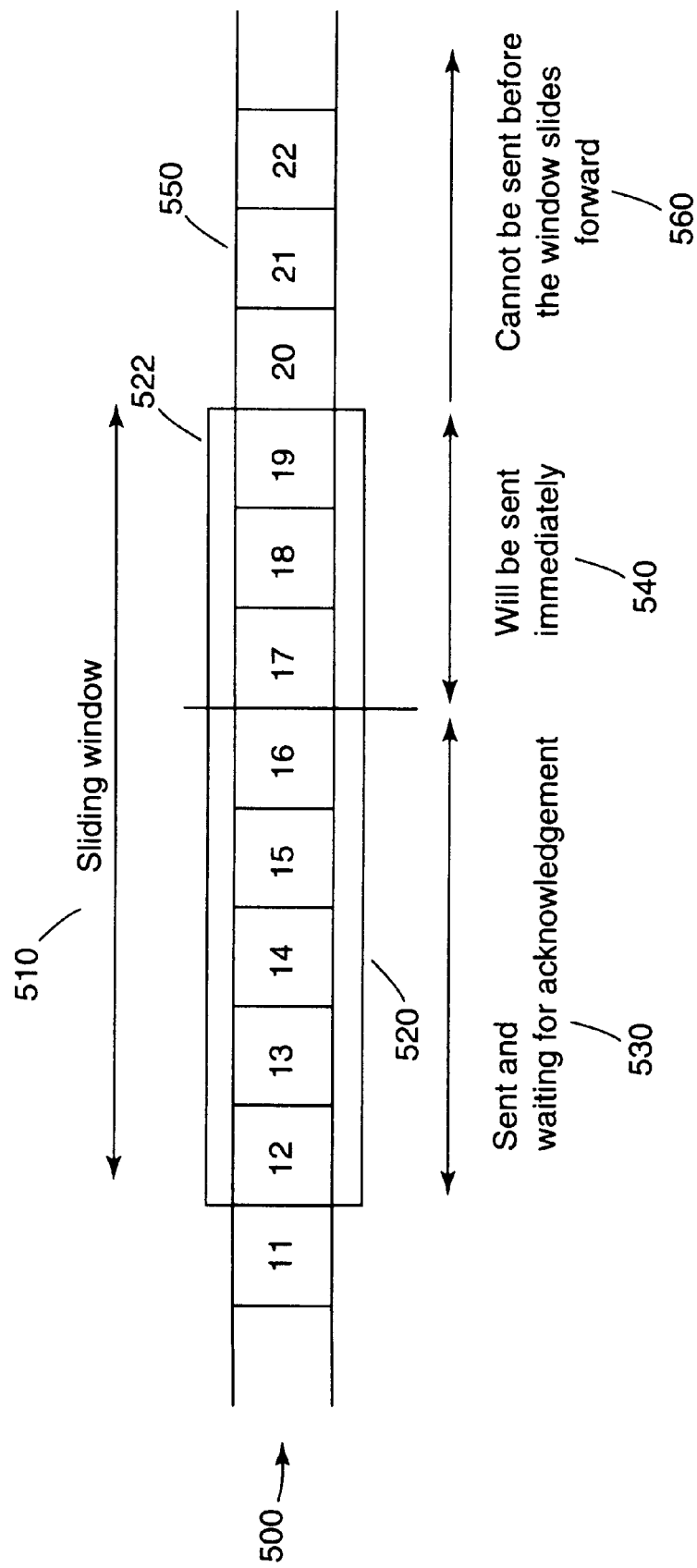
FIG. 5 illustrates a packet stream and a TCP sliding window.

FIG. 5 illustrates a packet stream 500 and a TCP sliding window 510. One of the main features of a TCP source is that it uses a sliding window 510 that determines the bytes and, consequently, the IP packets that can be sent before an acknowledgment is received from the receiver. This makes it possible to adjust the effective transmission rate of the source.

When the TCP source increases the size of the sliding window 510, its average transmission rate increases, too. The sliding window 510 is on top of octets 12–19. Octets up to 11 have been transmitted and the sliding window 510 has moved past them. Inside the sliding window 510, there are two octet groups 520, 522. The first octet group 520 is the octets from 12 to 16, which have been transmitted 530. The second group of octets 522 in the sliding window 510 are octets 17–19, which have not yet been transmitted. The second group of octets 522 can be sent immediately 540. Finally, octets 20 and upwards 550 cannot be transmitted 560. Octet 12 has to be acknowledged and the sliding window slid forward before octet 20 may be transmitted. Thus, TCP provides retransmission of lost data packets and flow control using this TCP sliding window 510. The sliding window 510 is actually the minimum of the congestion window of the window advertisement which is sent by the receiver.

Figure 6:
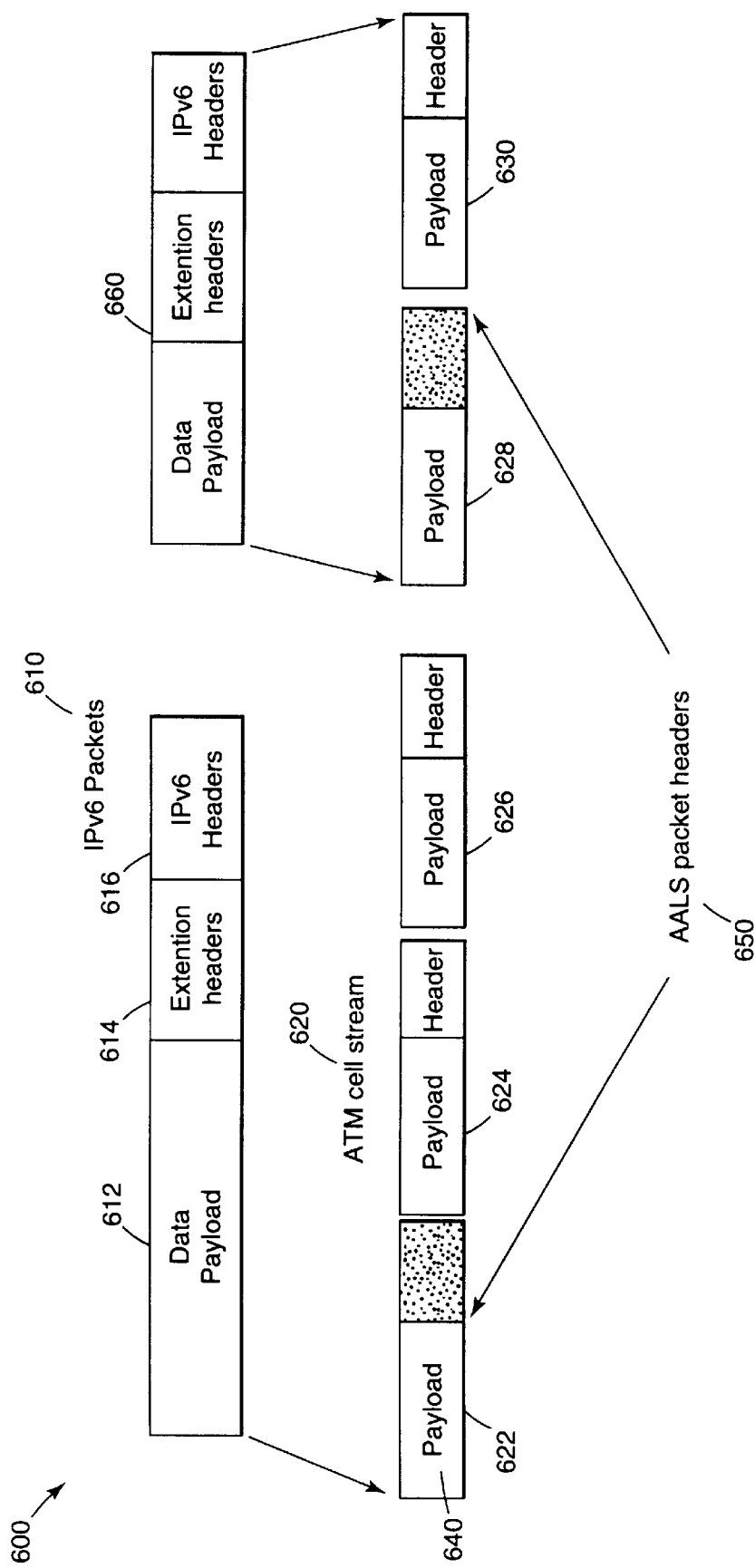
FIG. 6 illustrates the conversion of IPv6 packets into AAL5 packets according to the present invention.

FIG. 6 illustrates the conversion of IPv6 packets into AAL5 packets 600 according to the present invention. The IPv6 packets 610 includes a data payload 612, extension headers 614 and an IPv6 header 616. The IPv6 packets 610 are converted to an ATM cell stream 620, wherein each ATM cell 622–630 includes a payload 640 and an AAL5 packet trailer 650. AAL5 packet trailers 650 are used for identifying the end of IPv6 packets 610.

To carry packet data over ATM networks, ATM adaptation layer (AAL) functions are required to convert IP packets 610 into ATM cells 622–630 and vice versa. Although the AAL5 scheme is specified for carrying non-real-time packet data, it is also being increasingly used for real-time data. AAL5 uses a packet delimiter flag in the trailer 650 of the last ATM cell 626 of a segmented IP packet 610 to indicate the packet boundary.

Where an ECN scheme is used, bits are marked in the IPv6 header of traversing IP packets, i.e., layer 3 indication. For IP packets traversing a network with ATM in the backbone, there is no "direct" method to indicate ATM congestion (i.e., cell-level) for overloading IP ECN-capable flows. One possibility is to temporarily reassemble complete IP packets at congested ATM switches and then set their ECN bits to throttle sources. However, clearly, this is unfeasible due to the excessive computational overheads involved in packet reconstruction. Furthermore, since IP packets may comprise many ATM cells, additional buffering requirements will also arise.

Figure 7:
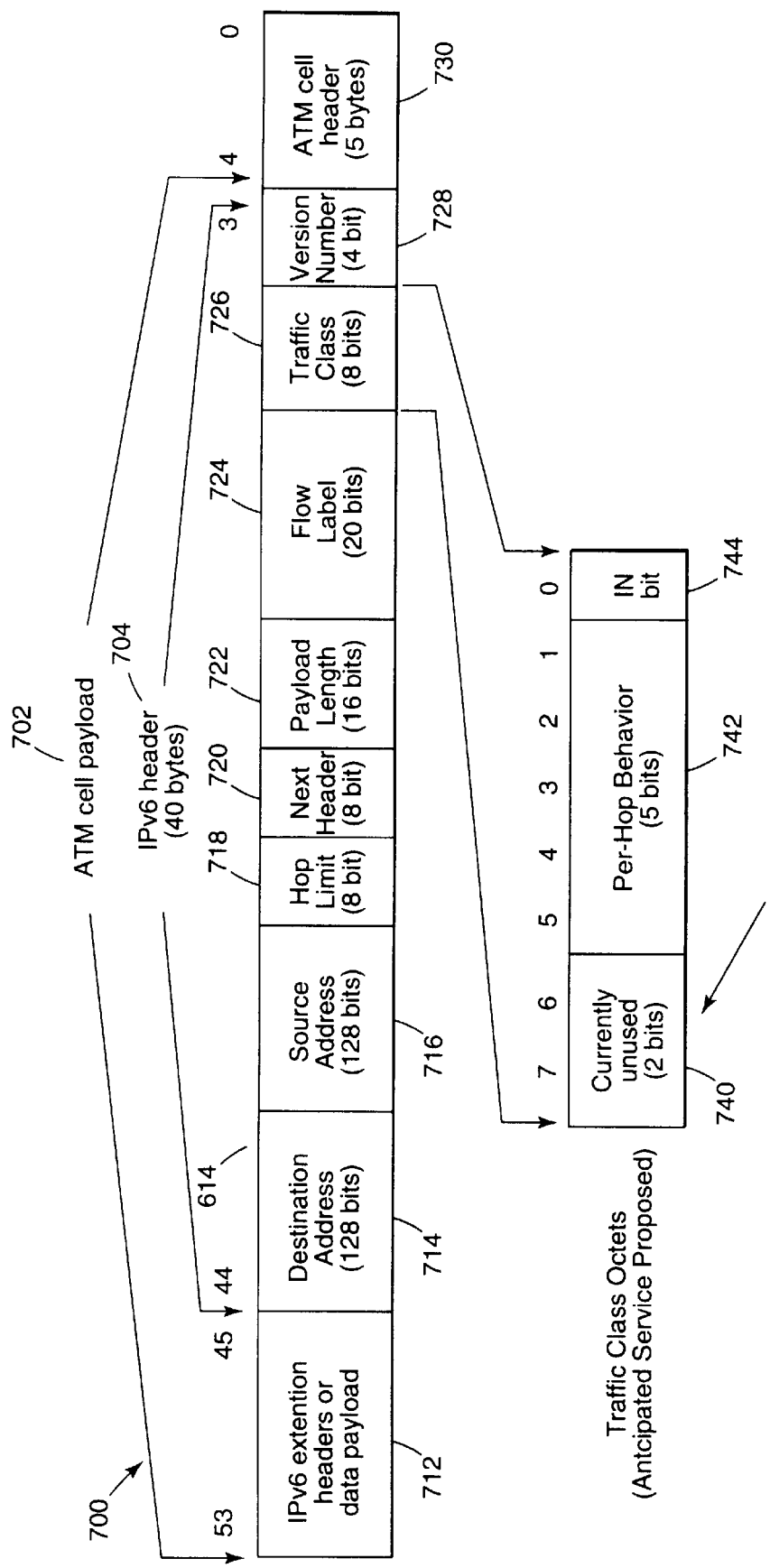
FIG. 7 illustrates IPv6 packet encapsulation using AAL5 according to the present invention.

FIG. 7 illustrates IPv6 packet encapsulation using AAL5 according to the present invention. As shown in FIG. 7, the AAL5 ATM cell 700 includes an ATM cell payload 702. The ATM cell payload 702 includes an IPv6 extension header or data payload 712, a destination address 714, a source address 716, a hop limit 718, a next header field 720, a payload length field 722, a flow label field 724, a traffic class field 726 and a version number field 728. The ATM cell 702 also includes an ATM cell header 730.

The IPv6 header 704 is comprised of a destination address 714, a source address 716, a hop limit 718, a next header field 720, a payload length field 722, a flow label field 724, a traffic class field 726 and a version number field 728. The traffic class field 726 is an octet in length and includes a 2 bit field 740 which is currently unused, a 5 bit per-hop behavior field 742, and a single indicator bit 744.

Referring to both FIGS. 6 and 7, in an ATM virtual connection (VC) carrying IPv6 packets 610 over AAL5, bits for the ECN flag reside in the header 616 of the IP packet 610, they will most likely fall within the payload 640 of the first ATM cell 622 of the AAL5 cell stream 620 for that particular packet 610, i.e., cell payload of 48 bytes covers the basic IPv6 header of 40 bytes. As mentioned previously, AAL5 uses a packet delimiter flag in the trailer 650 of the last ATM cell 626 of a segmented IP packet 610 to indicate the packet boundary. So clearly, the cell 628 proceeding an ATM cell 626 with its AAL5 packet delimiter flag set will be the first cell of the subsequent IP packet 660. This cell 628 will contain the ECN bits and hence it can be modified directly during congestion. The 2 bit field 740 in the traffic class field 726 may be used for ECN. For example, one bit may be set to indicate a ECN-capable cell and the other bit may be used to indicate congestion.

Figure 8:
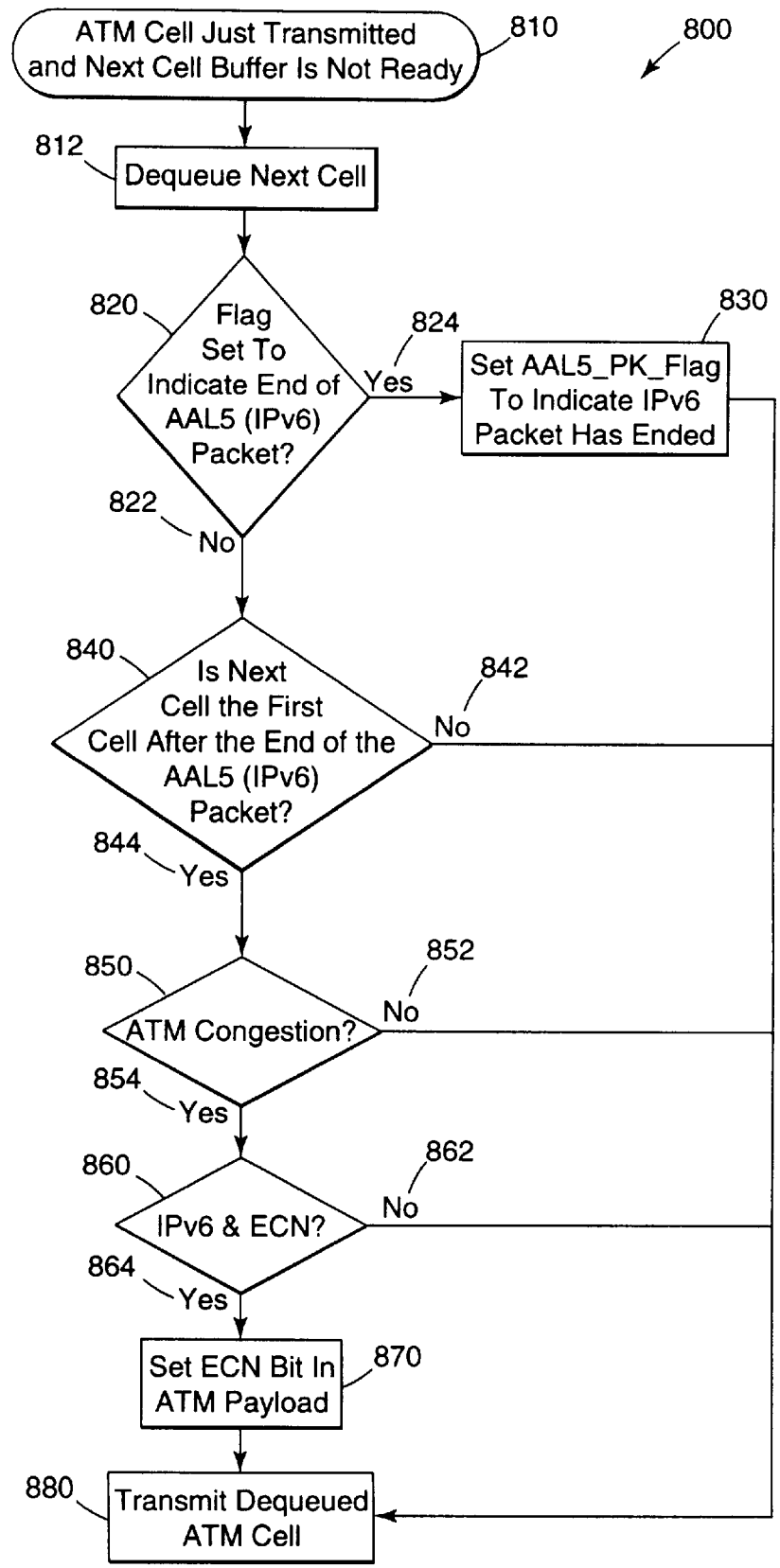
FIG. 8 illustrates a flow chart of the ECN-based approach for congestion management in hybrid IP-ATM networks according to the present invention.

FIG. 8 illustrates a flow chart of the ECN-based approach for congestion management in hybrid IP-ATM networks 800 according to the present invention. First, after an ATM cell has been transmitted and another cell is in the cell buffer 810, the next ATM cell for transmission is dequeued 812. Then, a determination is made as to whether the next cell includes the end of AAL5 (IPv6) packet 820. If the next cell is the end of AAL5 packet 824, the flag for indicating that an IPv6 packet had ended is set to an ON state 830 and the dequeued ATM cell is transmitted 880.

If the next cell is not the end of AAL5 packet 822, a determination is made as to whether the next cell is the first cell after AAL5 delimiter flag is set 840. If this is not the first cell after the AAL5 flag is set 842, the dequeued ATM cell is transmitted 880. If this is the first cell after the AAL5 flag is set 844, the flag is reset to an OFF state to clear the flag for the next packet 846.

Then, a determination is made as to whether ATM congestion exists 850. This may be accomplished by any suitable metric. If ATM congestion does not exists 852, the dequeued ATM cell is transmitted 880. If ATM congestion does exists 854, then the protocol type and ECN-capability is checked in the IPv6 header 860. If the cell is not for an IPv6 a packet or is not ECN capable 862, the dequeued ATM cell is transmitted 880. If the cell is for an IPv6 packet and it is ECN capable 864, the ECN bit in ATM payload is set 870. Then, the dequeued ATM cell is transmitted 880.

Figure 9:
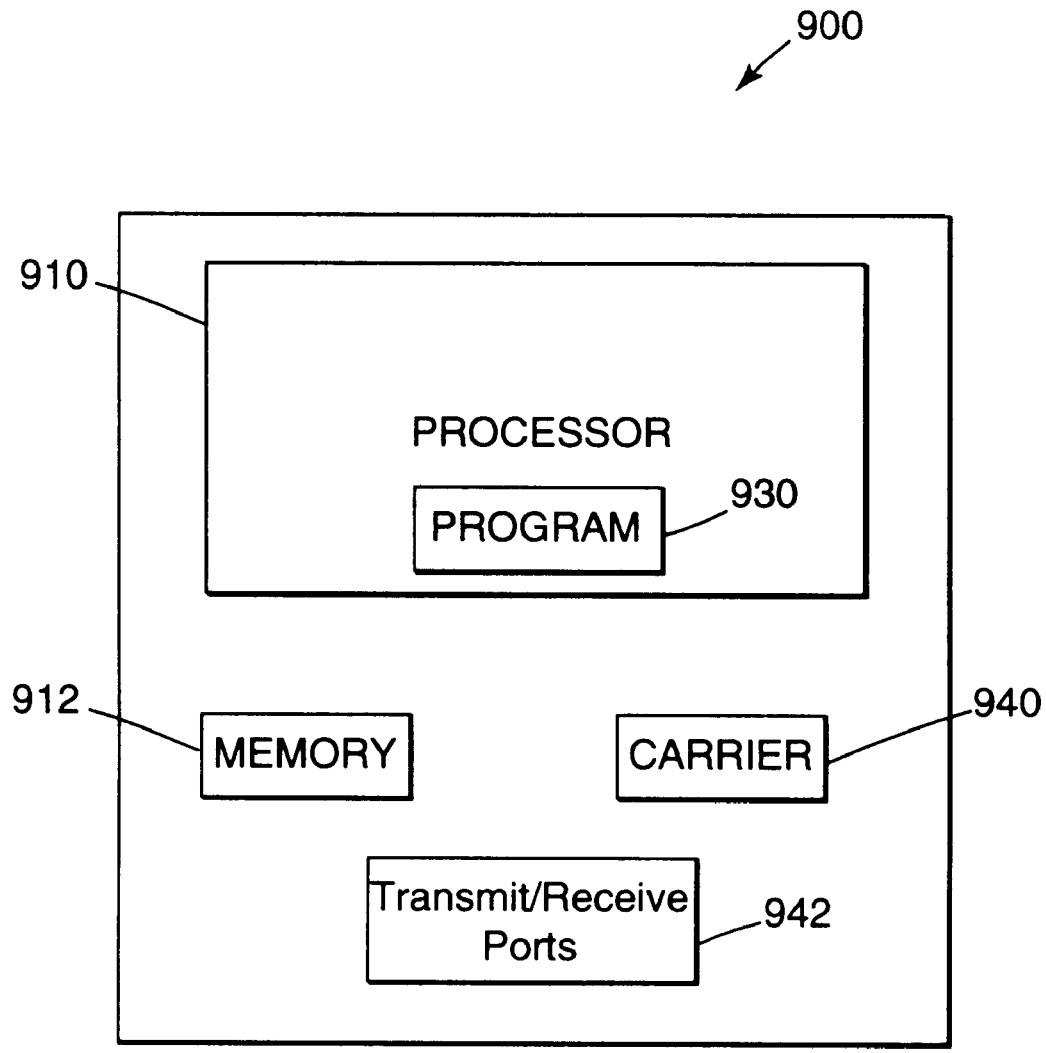
FIG. 9 illustrates a block diagram of a hardware implementation of the present invention.

FIG. 9 illustrates a block diagram of a hardware implementation 900 of the present invention. An ATM switch according to the present invention includes a processor 910 and memory or buffer 912 which may include random access memory (RAM), or any other memory configuration. The processor 910 operates under the control of an operating system (not shown) and is configured to executes one or more computer programs, which are represented in FIG. 9 by the "box" 930 within the block indicating the processor 910. Generally, the computer programs 930 may be tangibly embodied in a computer-readable medium or carrier 940. The computer programs 930 may be loaded from the computer-readable medium or carrier 940 into memory 912 for execution by the processor 910 as discussed above with reference to FIGS. 6–8. The computer program 930 comprises instructions which, when read and executed by the processor 910, causes the processor 910 to perform the steps necessary to execute the steps or elements of the present invention. ATM cells are received via ports 942, buffered in memory 912, and the transmitted via ports 942 under control of the processor 910, which provides congestion management as discussed above with reference to FIGS. 6–8. Those skilled in the art will therefore recognize that memory 912 may be separate memory devices for running the program 930 and for buffering ATM cells, or may be a signal memory device. Further, although an exemplary system configuration is illustrated in FIG. 9, those skilled in the art will recognize that any number of different configurations performing similar functions may be used in accordance with the present invention.

Thus, according to the present invention, a one-bit flag is required to keep track of packet boundaries, i.e., the AAL packet flag, along with simple logic to verify the protocol header in the IPv6 packet. Since the respective locations of the AAL5 packet delimiter flags and the ECN bits are fixed via the predefined packet formats, simple offsets can be computed to access the respective bits. In addition, since the IP packet header is not included in the checksum computation or scrambled by the IPv6 security features, other special considerations are not necessary. Clearly, such ECN bit marking can be done at any congested ATM node, regardless of whether the ATM node is an ATM access node or an ATM backbone device. Furthermore, this approach can work with any underlying ATM bearer capability, i.e., CBR, VBR, ABR, UBR.

The AAL5 delimiter flag detection capabilities are already widely available in many commercial ATM vendor equipment. In particular, this functionality is required for implementing well-known packet discarding schemes, i.e., early and partial packet discard. These schemes also monitors AAL5 packet delimiters, using them to discard complete IP packets during (impending) congestion, thereby reducing the deleterious effects of packet-fragmentation. Therefore, packet discarding and ECN congestion notification approaches can be used with ATM nodes.

For multi-level queues, thresholds can be used to signal different levels of congestion. During mild congestion intervals, the ECN bits in IP packets can be set using the present invention. If congestion persists or increases, packet discarding can be performed instead. Although the choice of congestion indicators has not been finally defined, in order to ensure reliable interoperation with advanced IPv6-type routers, techniques such as RED can be used. This will help limit spurious notifications. For the special case of underlying ABR connections, the ECN bit indication can also be coupled with the explicit rate (ER) control mechanism.

Packet fragmentation effects, however, pose problems for ECN-type schemes. The IPv6 protocol allows for packet "tunneling" to mitigate the effects of packet fragmentation during route changes. This essentially means that the DS byte of the encapsulated packet is copied to the header of the outer IP packet (at the entrance to the tunnel). However, the current standards do not require copying the DS byte back to the header of the encapsulated packet at the exit of the tunnel, and hence ECN information can be lost. Hence, simply setting the ECN bit in the outer-most encapsulation layer still may not throttle overloading sources if packet fragmentation occurs. Nevertheless, since this problem is not specific to ATM in any manner, IP standards may be amended themselves as a solution. Additionally, packet fragmentation is likely to be rare, especially as advanced IPv6 routers capable of handling larger packet sizes become increasingly commonplace. Also, if the IP hosts are directly connected to the ATM sub-network, i.e., without intermediate IP sub-networks via Multi-Protocol Over ATM (MPOA) solutions, packet fragmentation issues will not arise.

In summary, new service definitions are beginning to emerge for the Internet, intended to improve end-to-end user performance over IP networks. One such example is the proposed differentiated services paradigm which will likely also include ECN capabilities to directly notify sources during congestion periods. At the same time, the ongoing deployment of ATM technology means that IP-over-ATM is becoming an increasingly important issue. A problem with this integration is that it is difficult for cell-based ATM switches to modify congestion control information in the IP packets due to reconstruction overheads, etc. However, for the case of ECN-ATM indication, since the congestion information is minimal, i.e., one bit, direct ATM-level coupling is feasible. According to the present invention, the ECN scheme is defined to allow ATM networks to participate in IP-level ECN notification schemes. The scheme is of minimal complexity and uses AAL5 packet trailers to detect packet boundaries and locate the appropriate ECN bits in traversing IPv6 packets. The required functionality is independent of the underlying ATM bearer mobilities and can be implemented within ATM access equipment as well as backbone nodes. The ECN scheme according to the present invention will result in improved performance for ECN-capable IP traffic over ATM networks.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for congestion management in hybrid IP-ATM networks, comprising:
   using AAL5 packet trailers in ATM cells to detect packet boundaries for identifying a first cell in an IP packet;
   determining whether an ATM cell is capable of using explicit congestion notification to indicate congestion; and
   setting an explicit congestion notification indicator in a capable ATM cell to indicate congestion to a source node.

2. The method of claim 1 wherein the using packet trailers further comprises monitoring a flag for indicating whether an ATM cell is an end of packet.

3. The method of claim 2 further comprising resetting the end of packet flag to an off state so the next cell is recognized as a first cell of a packet and transmitting the ATM cell.

4. The method of claim 3 further comprising determining whether a next ATM cell is a first ATM cell for a packet.

5. The method of claim 4 further comprising transmitting the next ATM cell when the ATM cell is not a first ATM cell for a packet.

6. The method of claim 4 further comprising determining whether ATM congestion is associated with the next ATM cell.

7. The method of claim 6 further comprising transmitting the next ATM cell when congestion is not associated with the next ATM cell.

8. An ATM switch, comprising:
   receive ports for receiving ATM cells thereon;
   a buffer, coupled to the receive ports, for storing ATM cells for processing;
   a processor, coupled to the buffer, for controlling the processing of the ATM cells; and
   transmit ports, coupled to the buffer, for transmitting the ATM cells in the buffer;
   wherein the processor providing congestion management in hybrid IP-ATM networks, the processor using AAL5 packet trailers in the received ATM cells to detect packet boundaries for identifying a first cell in an IP packet; determining whether the first cell in an IP packet is capable of using explicit congestion notification to indicate congestion and setting an explicit congestion notification indicator in a capable ATM cell to indicate congestion to a source node.

9. The ATM switch of claim 8 wherein the using packet trailers further comprises monitoring a flag for indicating whether an ATM cell is an end of packet.

10. The method of claim 9 further comprising resetting the end of packet flag to an off state so the next cell is recognized as a first cell of a packet and transmitting the ATM cell.

11. The method of claim 10 further comprising determining whether a next ATM cell is a first ATM cell for a packet.

12. The method of claim 11 further comprising transmitting the next ATM cell when the ATM cell is not a first ATM cell for a packet.

13. The method of claim 11 further comprising determining whether ATM congestion is associated with the next ATM cell.

14. The method of claim 13 further comprising transmitting the next ATM cell when congestion is not associated with the next ATM cell.

15. An article of manufacture for a processor-based ATM switch, the article of manufacture comprising a computer readable medium having instructions for causing a processor to perform a method comprising:

using AAL5 packet trailers in ATM cells to detect packet boundaries for identifying a first cell in an IP packet;

determining whether an ATM cell is capable of using explicit congestion notification to indicate congestion; and setting an explicit congestion notification indicator in a capable ATM cell to indicate congestion to a source node.

16. The method of claim 15 wherein the using packet trailers further comprises monitoring a flag for indicating whether an ATM cell is an end of packet.

17. The article of manufacture of claim 16 further comprising resetting the end of packet flag to an off state so the next cell is recognized as a first cell of a packet and transmitting the ATM cell.

18. The method of claim 17 further comprising determining whether a next ATM cell is a first ATM cell for a packet.

19. The method of claim 18 further comprising transmitting the next ATM cell when the ATM cell is not a first ATM cell for a packet.

20. The method of claim 18 further comprising determining whether ATM congestion is associated with the next ATM cell.

21. The method of claim 20 further comprising transmitting the next ATM cell when congestion is not associated with the next ATM cell.

* * * * *